(12) United States Patent
Ceotto et al.

(10) Patent No.: US 11,039,710 B2
(45) Date of Patent: Jun. 22, 2021

(54) COFFEE MACHINE

(71) Applicant: CMA MACCHINE PER CAFFE' S.r.l., Susegana (IT)

(72) Inventors: Beppino Ceotto, Silve (IT); Giovanni Rossetto, Conegliano (IT)

(73) Assignee: CMA MACCHINE PER CAFFE' S.r.l., Susegana (IT)

( * ) Notice: Subject to any disclaimer, the term of this patent is extended or adjusted under 35 U.S.C. 154(b) by 64 days.

(21) Appl. No.: 16/290,057

(22) Filed: Mar. 1, 2019

(65) Prior Publication Data
US 2019/0191918 A1 Jun. 27, 2019

Related U.S. Application Data

(63) Continuation of application No. 15/037,060, filed as application No. PCT/IB2015/053972 on May 27, 2015, now Pat. No. 10,219,649.

(30) Foreign Application Priority Data

May 27, 2014 (IT) .......................... MI2014A000972

(51) Int. Cl.
*A47J 31/00* (2006.01)
*A47J 31/42* (2006.01)
(Continued)

(52) U.S. Cl.
CPC ............. *A47J 31/42* (2013.01); *A47J 31/007* (2013.01); *A47J 31/0626* (2013.01); *A47J 31/44* (2013.01);
(Continued)

(58) Field of Classification Search
CPC ................ A47J 31/0626; A47J 31/0663; A47J 31/0657; A47J 31/24; A47J 31/34; A47J 31/4464
(Continued)

(56) References Cited

U.S. PATENT DOCUMENTS 4,796,521 A * 1/1989 Grossi ................. A47J 31/3619
99/287
5,722,313 A * 3/1998 Schmed .............. A47J 31/3614
99/289 R
(Continued)

FOREIGN PATENT DOCUMENTS

DE 4139804 5/1993
FR 2880785 7/2006
(Continued)

OTHER PUBLICATIONS

WO 2011/092644 (Lenzi) Aug. 2011.
(Continued)

*Primary Examiner* — Reginald Alexander
(74) *Attorney, Agent, or Firm* — Silvia Salvadori

(57) ABSTRACT

The coffee machine has at least one infusion unit and at least one filter holder that is manually connected to and disconnected from the infusion unit for preparation of coffee, and it comprises at least one added support element of the filter holder for keeping it attached to the coffee machine when the filter holder is not connected to the infusion unit, said added support element comprising heating means for heating said filter holder to a predetermined temperature. The additional support element can be implemented also as a standalone element and, therefore, not connected to the coffee machine.

12 Claims, 3 Drawing Sheets

(51) Int. Cl.
*A47J 31/44* (2006.01)
*A47J 31/06* (2006.01)

(52) U.S. Cl.
CPC ......... *A47J 31/446* (2013.01); *A47J 31/4464* (2013.01); *A47J 31/4467* (2013.01); *A47J 31/0663* (2013.01)

(58) Field of Classification Search
USPC ............................................ 99/302 R, 302 P
See application file for complete search history.

(56) References Cited

U.S. PATENT DOCUMENTS

| | | | |
|---|---|---|---|
| 5,794,519 A * | 8/1998 | Fischer | A47J 31/0668 99/295 |
| 5,813,318 A | 9/1998 | Zanin | |
| 6,330,849 B1 | 12/2001 | Chao | |
| 6,779,434 B2 | 8/2004 | Hsu | |
| 7,814,824 B2 * | 10/2010 | Beretta | A47J 31/56 99/282 |
| 8,215,229 B2 * | 7/2012 | Faccinti | A47J 31/469 99/280 |
| 8,973,435 B2 | 3/2015 | Preston | |
| 10,219,649 B2 * | 3/2019 | Ceotto | A47J 31/4467 |
| 2002/0170438 A1 | 11/2002 | Liu | |
| 2009/0126578 A1 | 5/2009 | Amann | |

FOREIGN PATENT DOCUMENTS

| | | |
|---|---|---|
| FR | 2883464 | 9/2006 |
| WO | 2009065166 | 5/2009 |

OTHER PUBLICATIONS

Search Report for Italian priority application No. IT-MI2014A000972.
International Search Report and written opinion of PCT/IB2015/053972.

* cited by examiner

COFFEE MACHINE

This U.S. non-provisional application is a continuation of U.S. patent application Ser. No. 15/037,060 filed on May 17, 2016, which is a U.S. National Stage of PCT/IB2015/053972 filed May 27, 2015, which claims priority to and the benefit of Italian patent application No. MI2014A000972 filed May 27, 2014, the contents of each of which are incorporated herein by reference in their entirety.

FIELD OF THE INVENTION

The present invention relates to a coffee machine. More specifically, the present invention refers to a coffee machine having improved conditions of beverage dispensing. As known, depending on devices being in a machine coffee and their intended use, existing coffee machines can be substantially subdivided into three main categories: automatic machines, manual machines, or semiautomatic machines.

KNOWN BACKGROUND ART

The manual coffee machine requires that the filter holder is manually refilled every time a coffee is made, whereas the refilling in an automatic machine is automatic.

A coffee machine of semiautomatic type allows both operations.

In particular, the operation system of these machines provides for the hot water contacting the powdered coffee to cover a specific path in order to make the infusion. The obtained coffee beverage is sensible to different parameters used in the process, such as for example the used coffee quality, its grain size, the water temperature and pressure during the infusion cycle.

Nowadays coffee machines present on the market include a filter holder, that the operator manually connects to the infusion unit of the machine.

The filter holder can be filled manually with powdered coffee and subsequently connected to the infusion unit or filled automatically with powdered coffee only after its correct positioning on the infusion unit.

In this latter case, powdered coffee is then compressed and then the infusion unit releases a predetermined water amount at temperature and pressure that are optimal for preparing coffee with the best organoleptic characteristics.

In both cases, once the coffee has been prepared the filter holder is manually detached from the machine and the exhausted powdered coffee is thrown away.

In this way the filter holder can be reused for preparing another coffee.

This kind of machine can be equipped with one or more infusion unit and, consequently, with several filter holders.

Usually for each infusion unit there are several filter holders, at least one for espresso coffees and one for double espresso coffees.

In these machines if the filter holder is at room temperature, for example when the first coffee is made after a time interval that has allowed the cooling thereof, its mass tends to cool the hot water during the infusion process thereby causing a decline of qualitative features of the coffee made.

In machines up to now manufactured, the filter holder is maintained hot by keeping it attached to the infusion unit of the coffee machine. If several filter holders are available in the machine equipment per each infusion unit, it is evident that only one will be maintained at working temperature, whereas the others will be at room temperature.

SUMMARY OF THE INVENTION

The technical purpose the present invention proposes is to implement a coffee machine in which the water of the infusion unit is not cooled during its transition through the filter holder.

As part of this purpose, an object of the present invention is to implement a coffee machine that is able to make a coffee beverage with a filter holder having always an optimal temperature independently of its usage frequency.

Another object is to implement a coffee machine performing a heating of the filter holder during its use so that the quality of coffees made can be standardized.

Another object of the invention is to implement a coffee machine in which the added support element for heating a filter holder is present on the machine in an ergonomic position for the user.

Not the last object of the invention is to implement a coffee machine using mainly its components for heating the filter holder.

This purpose, as well as these and other objects are achieved by a coffee machine having at least one infusion unit and at least one filter holder that is manually connected to and disconnected from said infusion unit for the preparation of coffee, characterized by comprising at least one added support element of said filter holder for keeping it attached to the coffee machine when said filter holder is not connected to said infusion unit, said added support element comprising heating means for heating said filter holder to a predetermined temperature.

The heating support element is placed in a position outside of the coffee delivery space, i.e. in a position in which the filter holder, during the heating thereof, does not interfere with normal operations of coffee, or other beverage, delivery. In an embodiment of the invention, the heating support element can be used for a first filter holder, whereas a second filter holder is engaged on the infusion unit, for example for a beverage dispensing. Preferably, said heating support element (4) is arranged above or sideways to said at least one infusion unit (2).

According to an embodiment of the coffee machine of the invention, the heating support element comprises a housing for said filter holder; the filter holder can be inserted partially, or completely, in said housing. Preferably, at least part of the profile of the housing of the filter holder has a shape complementary to that one of the filter holder in order to improve the heating thereof.

According to another embodiment of the coffee machine of the invention, the heating support element comprises a protruding element that protrudes from the machine, such protruding element can be heated and a filter holder can be placed thereon, so that the heating protruding element is housed at least partially in the cavity of the filter holder when the filter holder is engaged with the heating support element. Also this embodiment of the invention can provide that the whole assembly, i.e. the filter holder and the heating element, is housed in the body machine in a way not to interfere with the delivery operations of beverages from filter holders in use, i.e. those ones engaged with the infusion units.

The claims depending from the main claim better specify that the coffee machine, according to the invention, comprises means of automatic filling of the filter holder with a predetermined dosage of powdered coffee.

In particular, the means of automatic filling comprise a grinder for producing coffee powder and an element for transferring the powder from the grinder to the filter holder when the latter is connected to the infusion unit.

The heating means comprise at least one resistance combined with the support element, which is activated independently of the operation of the infusion unit, or else a tube for conveying hot water combined with the support element and circulating water simultaneously with the operation of said infusion unit.

Conveniently, the added support element comprises engaging means for the engagement with the filter holder that are defined by bayonet connection members or else by slide connection members or by a magnet or an electromagnet activated by the electric power that activates the resistance.

BRIEF DESCRIPTION OF THE DRAWINGS

Further characteristics and advantages of the invention will be more evident from the description of a preferred, but not exclusive, embodiment of the coffee machine of the invention depicted for illustration purposes only, and without limitation, in the attached drawings, in which.

DETAILED DESCRIPTION OF PREFERRED EMBODIMENTS OF THE INVENTION

Figure 1A:
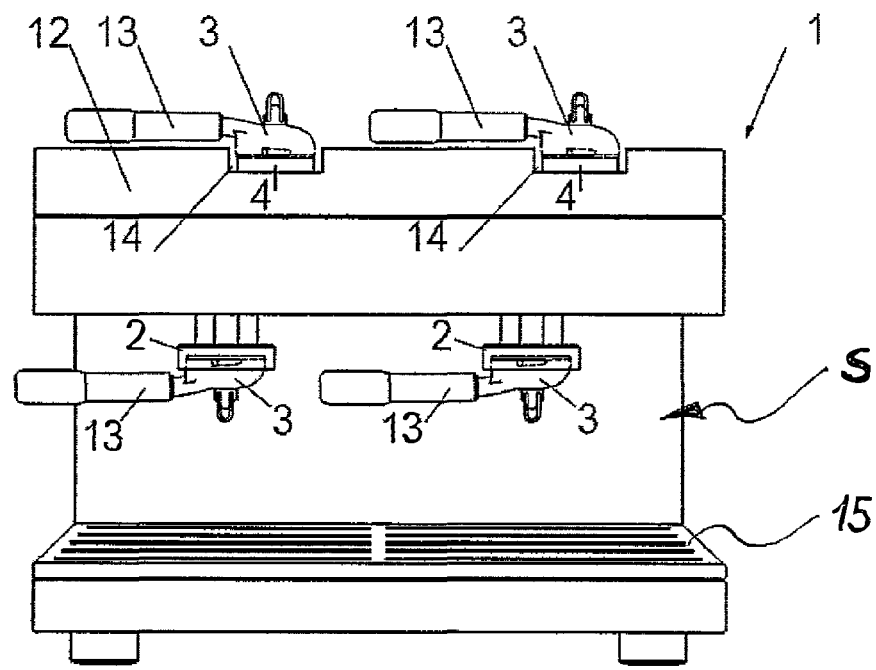
FIG. 1A is a schematic front elevation view of the coffee machine according to the invention, in which the added support element of the filter holder of the invention can be seen.
Figure 1B:
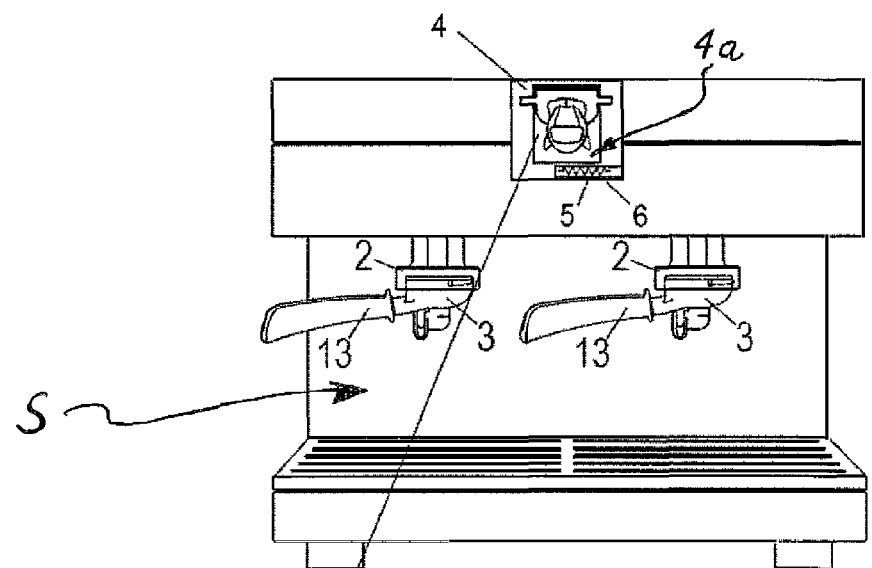
FIG. 1B is a schematic front elevation view of another embodiment of the invention.

Referring particularly to FIGS. 1A and 1B the coffee machine, generally depicted with reference number 1, comprises in a way per se known one or more infusion units 2 to which the respective filter holders 3 for preparing the coffee beverage are manually connected or disconnected by the operator. The filter holders 3 are provided with a handle 13 in a way known in the art.

Below the infusion units 2 there is a space S, named work space, in which containers (not shown) for the dispensed beverage are placed; the containers, usually cups or glasses having different size, are leant on a shelf 15 below the infusion units; the shelf 14 delimits the work space S from below. As better described hereinafter, the heating support elements 4 are preferably arranged above the infusion units (see, for example, FIGS. 1A and 1B) and are anyway arranged outside of the work space S, i.e. of the beverage dispensing area.

The coffee machine described hereinafter is of the type comprising automatic filling means to fill the filter holder with a predetermined dosage of powdered coffee.

In particular, the automatic filling means comprise a grinder for producing coffee powder and an element for transferring the powder from the grinder to the filter holder when the latter is connected to the infusion unit.

Both the grinder and the transferring element, the latter being for example a conveying tube of telescopic or positionable type or something else, are not represented in the drawings.

Furthermore, hereinafter for sake of simplicity a coffee machine of the above mentioned type will be described, having only two infusion units and its respective filter holders.

Nonetheless, the infusion units and the filter holders can be of any number depending on needs.

As mentioned, the filter holder can be filled automatically by means of a grinder but, in case the coffee machine has not it, this does not dismiss the possible manual filling of the filter holder by the operator.

In particular, the coffee machine 1 has at least one infusion unit 2 and at least one filter holder 3, the latter being manually connected to and disconnected from the infusion unit 2 by the operator for preparing coffee.

The coffee machine 1 comprises at least one additional support element 4 of the filter holder 3 in order to allow its retaining to the coffee machine when the filter holder 3 is not used and is detached from the infusion unit 2.

Obviously the coffee machine can have several support elements 4 depending on needs. The embodiment of FIG. 1A is provided with two support elements 4, whereas that one of FIG. 1B has only one additional support element 4.

The additional support element 4 comprises heating means to lead the filter holder 3 up to a predetermined temperature before the automatic or manual filling thereof with powdered coffee 15.

This arrangement prevents the infusion water from being cooled by the mass of the filter holder 3 also after the filter holder 3 has cooled after the last coffee has been prepared.

In this way the organoleptic characteristics of the made coffee are completely preserved, independently of the time lapse occurring between a coffee and the subsequent one.

In a preferred solution, the heating means comprise at least one resistance 5 combined with the support element 4, the resistance being activated independently of the operation of the infusion unit 2.

The resistance 5 is inserted in a plug 6 that can be replaced easily in case of failure or malfunction. Obviously, in a support element 4 there can be several plugs 6 having an arrangement adapted to optimally transfer the heat to the filter holder 3.

Figure 4:
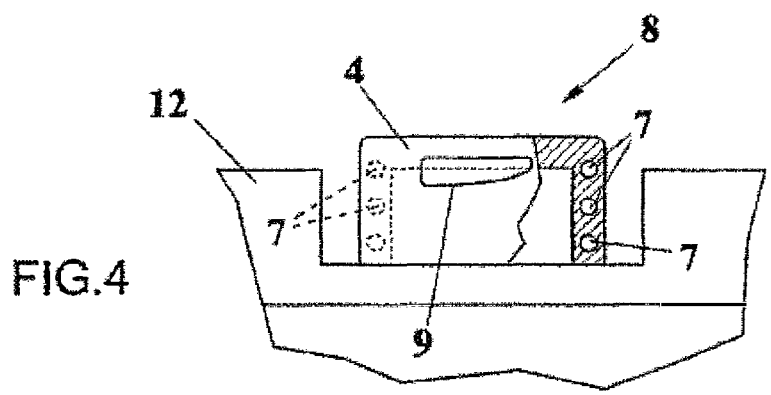
FIG. 4 is a view of the added support element that is heated by hot water according to another embodiment of the invention.

In a constructive variation shown in FIG. 4, the heating means comprise a tube 7 for conveying hot water, said tube being combined with said support element 4.

The hot water can be circulated concurrently with the operation of the infusion unit so that the elements preexisting in the coffee machine can be used for its circulation and heating, so that costs and construction complexity can be kept down.

The added support element 4 comprises engaging means, generally denoted with reference number 8, with the filter holder to allow the latter to be connected to the support element 4 during heating in the same way for the connection to the infusion unit 2.

Figure 2:
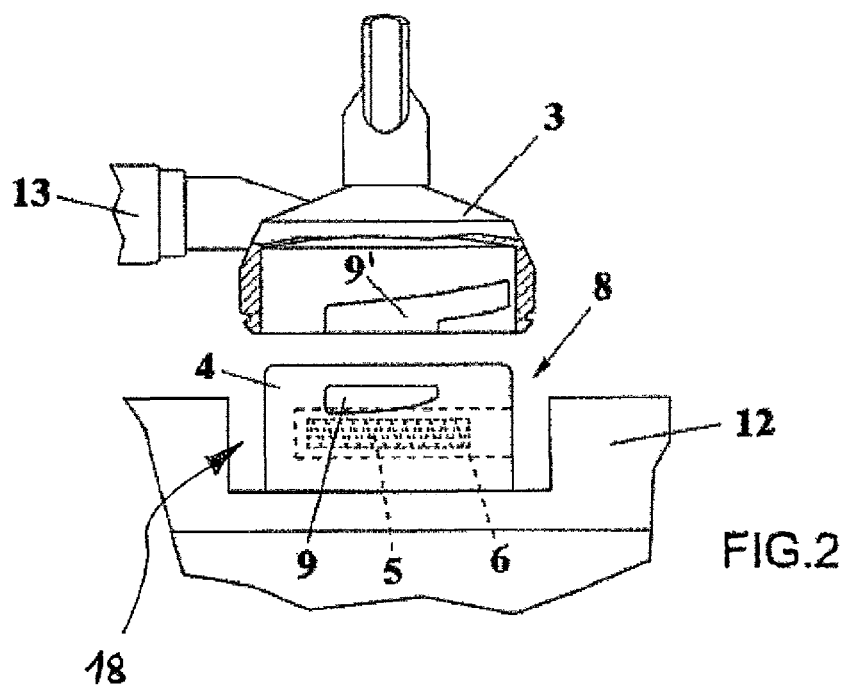
FIG. 2 è a view of the added support element that is heated by an electric resistance and has bayonet connection members according to a first embodiment of the invention, and of the respective filter holder.

For example, if the filter holder 3 is connected to the infusion unit by a bayonet mount, the engaging means comprise bayonet connection members 9, 9' allowing the reciprocal connection between the support element 4 and the filter holder 3 through a roto-translation of the latter. This solution is shown in FIG. 1A and in FIG. 2. These figures describe a support element 4 provided with the male portion, i.e. with the two tabs 9 of the bayonet mount. The female portion 9' of the mount is on the filter holder 3.

Figure 1C:
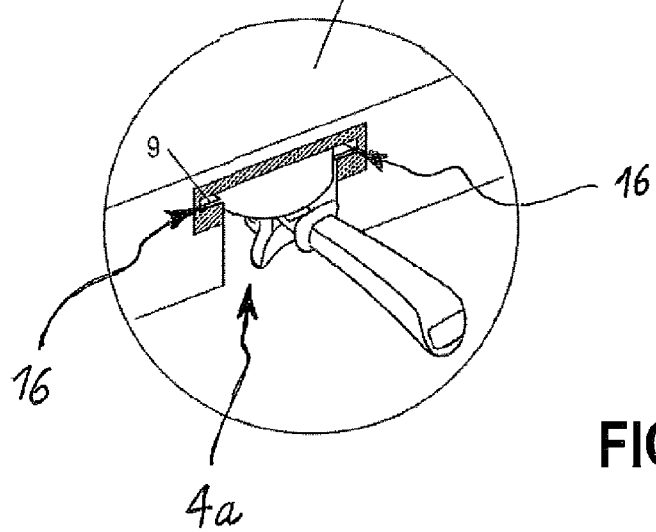
FIG. 1C is an enlarged view of a particular of the embodiment of FIG. 1B.

In the example of the embodiment of FIGS. 1B and 1C, the filter holder 3 is provided with tabs 9 for the bayonet mounting in the infusion units 2. In this case, the support element 4 is provided with two guides 16 accommodating the tabs 9 of the filter holder 3 and it is formed by a space inside the body of the machine 1 that can house the filter holder 3 in order to heat it, for example when the filter holder is not engaged with the infusion unit; preferably, the support element 4 is at least in part complementarily-shaped with the filter holder 3. The filter holder 3 is inserted in the support element 4 through a translation movement, in fact the tabs 9 and the guides 16 form slide connection means between the machine 1 and the filter holder 3.

Generally, two types of support elements 4 are provided. Referring to FIGS. 1A, 2-5, the shown support elements provide a protruding element shaped so that to be housed at least in part inside the filter holder. In the embodiment, the majority of the surface heated by the support element will be in contact with that one inside of the filter holder, thereby transmitting heat to that surface by conduction.

In another embodiment type exemplified by the support elements shown in FIGS. 1B and 1C, the support element 4 has a structure inverted to that one discussed above; in fact, the support element houses the filter holder 3 within itself. In this embodiment the housing is preferably shaped complementarily to the filter holder; the outer walls of the filter holder can be in contact with the walls of the support element. In any case, this embodiment has the advantage that the filter holder is mostly housed in the support element and that the heating happens also by convection of the heat in the support element-housing, as can be easily seen in FIGS. 1B and 1C.

Figure 5:
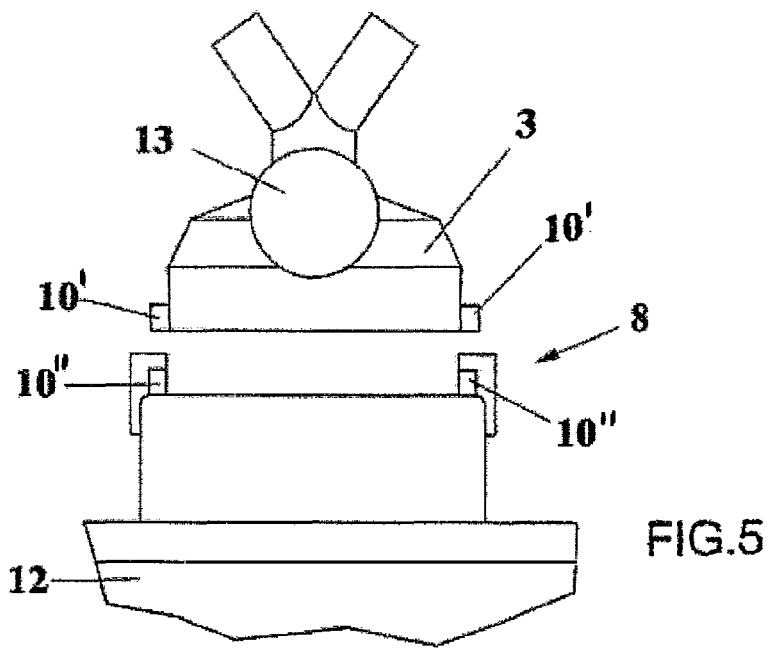
FIG. 5 is a side elevation view of the filter holder that can be combined with the added support element according to another embodiment of the invention, with the respective filter holder.

In the embodiment of FIGS. 1B and 1C, the filter holder is inserted in the housing support element 4 preferably through slide means, analogously to what described referring to FIG. 5. The sliding insertion means suitable for the invention are, for example and without limiting the invention to this example, those described in WO 2015/055557 in the name of the present Applicant. Preferably, as described at page 5 and in figures of WO '557, the sliding means comprise two opposing and coplanar guide arranged parallel one to another. Each of the two guides can preferably have an inlet zone defined by at least one inclined surface and, in particular, by two inclined surfaces, a lower one and an upper one, to define a simplified introduction of the tabs 9, 10' into the guides 16, 10".

Preferably, the guides have end positions defined by a wall for stopping the tabs and positioning correctly the filter holder.

In order to activate the heating of the support element 4 there can be detecting means to detect the presence of the filter holder in the guides 16, 10" or on the support element 4.

In a constructive variation shown in FIG. 5, the support element 4 is arranged above the body machine, as in the embodiments of FIG. 1A and FIGS. 2-4; in this embodiment, analogously to the embodiment shown in FIGS. 1B and 1C, the engaging means 8 comprise slide connection members 10 so that to simplify the connection between the support element and the filter holder without fatiguing the operator with rotary movements.

Figure 3:
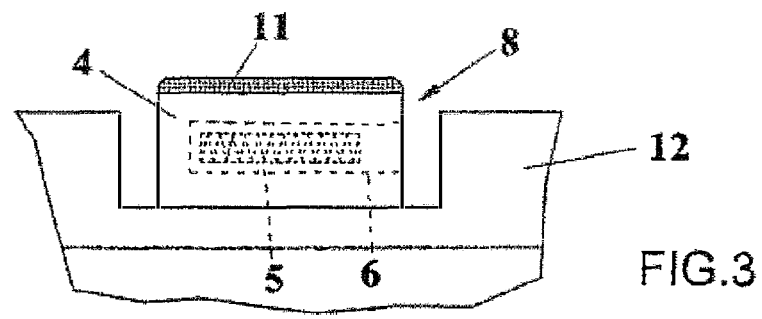
FIG. 3 is a view of the added support element according to another embodiment of the invention with connection members that connect with the filter holder and are defined by a magnet or electromagnet.

In another constructive variation shown in FIG. 3, the engaging means 8 comprise a magnet or electromagnet 11 activated by the same electric power activating the resistance 5. This embodiment provides that at least part of the filter holder comprises, or is made of magnetic material (for example magnetic steel) so that to be held in position. In this case the operator has only to move the filter holder 3 closer to the support element 8 that will attract it to itself by means of magnetic attractive force. In case the filter holder is made of non-magnetic material, metal parts will be realized on the same in order to allow its connection.

In case the support element 4 is assembled on the upper part 12 of the machine coffee, as denoted by way of example in FIG. 1A where it is housed in an appropriate seat 14, the filter holder can also be retained thereto simply by gravity with its handle 13 rested directly on the upper plane 12 of the machine 1.

The so-conceived invention is susceptible to several modifications and variations, all falling in the scope of the inventive conception.

Moreover, all details can be replaced by technically equivalent elements.

Practically, the used materials as well as the size may be any, depending on needs.

In particular, the heating system of the above described filter holder can be made as a self-contained element and therefore not connected to the machine coffee. Such a heating system has the features of the previously described one, except for having a system for controlling the temperature independent from the machine coffee.

The invention claimed is:

1. A coffee machine having at least one infusion unit and at least one filter holder that is manually connectable to and disconnectable from said infusion unit for holding coffee and providing with said infusion unit a chamber for preparation of a coffee beverage; at least one heating element suitable to engage said filter holder, said heating element comprising heating means for heating said filter holder to a predetermined temperature, wherein said heating element comprises a protruding element that protrudes from said machine, said protruding element being in contact with said filter holder and being at least in part positioned in a cavity of the wall of the machine.

2. The coffee machine according to the claim 1, wherein said heating element is arranged above or sideways said at least one infusion unit.

3. The coffee machine according to claim 1, wherein said heating element comprises a housing for said filter holder, said filter holder can be at least in part inserted in said housing.

4. The coffee machine according to claim 1, wherein said protruding element is arranged on the upper wall of said machine.

5. The coffee machine according to claim 1 further comprising a grinder for producing coffee powder and a conveyor element for transferring said coffee powder from said grinder to said filter holder when the latter is connected to said infusion unit.

6. The coffee machine according to claim 1, wherein said heating element comprises at least one resistance combined with said support element.

7. The coffee machine according to claim 6, wherein said resistance is activated independently of the operation of said infusion unit.

8. The coffee machine according to one of claim 1, wherein said heating element comprises a tube for conveying hot water, preferably said water being circulated simultaneously with the operation of said infusion unit.

9. A coffee machine according to claim 1 comprising a heating element for heating a filter holder for a coffee machine, wherein said heating element of the filter holder is self-contained and spaced from the coffee machine.

10. A coffee machine having at least one infusion unit and at least one filter holder that is manually connectable to and disconnectable from said infusion unit for holding coffee and providing with said infusion unit a chamber for preparation of a coffee beverage; at least one heating element suitable to engage said filter holder, said heating element comprising heating means for heating said filter holder to a predetermined temperature,
wherein said heating element comprises engaging means for engagement with said filter holder and wherein said engaging means comprise bayonet connection members.

11. A coffee machine having at least one infusion unit and at least one filter holder that is manually connectable to and disconnectable from said infusion unit for holding coffee and providing with said infusion unit a chamber for preparation of a coffee beverage; at least one heating element suitable to engage said filter holder, said heating element comprising heating means for heating said filter holder to a predetermined temperature, wherein said heating element comprises engaging means for engagement with said filter holder and wherein said engaging means comprise slide connection members.

12. A coffee machine having at least one infusion unit and at least one filter holder that is manually connectable to and disconnectable from said infusion unit for holding coffee and providing with said infusion unit a chamber for preparation of a coffee beverage; at least one heating element suitable to engage said filter holder, wherein said heating element comprises engaging means for engagement with said filter holder and wherein said engaging means comprise a magnet or an electromagnet activated by the electric power activating said resistance.

* * * * *